United States Patent [19]

Bell

[11] 4,363,580

[45] Dec. 14, 1982

[54] SELF-RETAINING CLOSE TOLERANCE BUSHING

[75] Inventor: John H. Bell, Danville, Calif.

[73] Assignee: The Boeing Company, Seattle, Wash.

[21] Appl. No.: 281,778

[22] Filed: Jul. 9, 1981

Related U.S. Application Data

[63] Continuation-in-part of Ser. No. 166,597, Jul. 7, 1980, abandoned.

[51] Int. Cl.$^3$ .............................................. F16B 13/06
[52] U.S. Cl. ...................................... 411/15; 411/501
[58] Field of Search ...................... 411/15, 24, 34, 501, 411/508, 504, 506, 507, 908, 907; 29/512, 522 A, 522 R, 523

[56] References Cited

U.S. PATENT DOCUMENTS

| | | | |
|---|---|---|---|
| 357,118 | 2/1887 | Dion | 411/501 |
| 985,761 | 2/1911 | Ogden | 411/15 |
| 1,951,168 | 3/1934 | Roth | 411/501 |
| 3,099,057 | 7/1963 | Cook | 411/15 X |
| 3,665,800 | 5/1972 | Ryder | 411/508 |

Primary Examiner—Ramon S. Britts
Attorney, Agent, or Firm—Hughes, Barnard & Cassidy

[57] ABSTRACT

In combination with a structural component, an improved self-retaining, non-metallic, molded bushing suitable for use in close tolerance applications—viz., applications where the inside and/or the outside diameters of the bushing must be maintained within ±0.005" and, in many instances, within ±0.002". More particularly, a self-retaining, non-metallic, close tolerance molded bushing having: (i) a tubular body portion with an outside diameter $D_1$; (ii) an integral, enlarged, premolded first retaining head at one end of the tubular body portion; (iii) the tubular body portion having an axially extending area of reduced wall thickness at its opposite end terminating in an outwardly flared extremity having an outside diameter $D_2$ (where $D_2$ is greater than $D_1$) and defining a resilient, deformable flip portion at the end of the tubular body portion remote from the enlarged first retaining head; (iv) an annular groove formed interiorly of the tubular body portion at the inboard end of the resilient, deformable flip portion for permitting the resilient, deformable, flip end to be expanded and flipped outwardly and reversely folded backwardly upon the tubular body portion so as to define a second enlarged retaining head; and (v) an integral stepped external shoulder having an outer diameter $D_3$ (where $D_3$ is at least equal to and, preferably greater than, $D_2$ but is less than the diameter of the first enlarged retaining head) formed on the tubular body portion intermediate the first enlarged retaining head and the annular groove for providing a snug close tolerance fit in the bushing-receiving hole in the structural component(s) into which the bushing is inserted.

8 Claims, 6 Drawing Figures

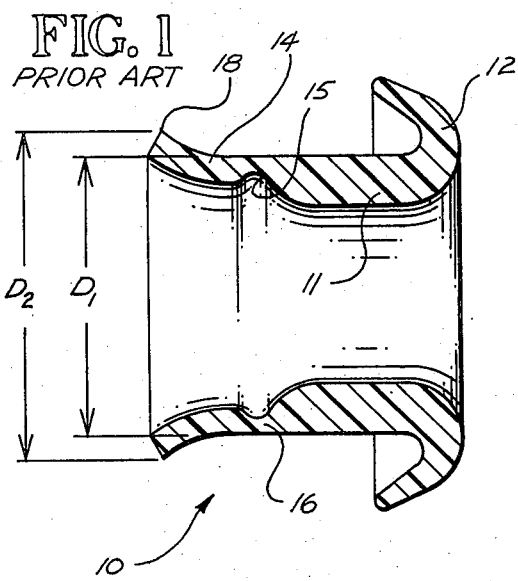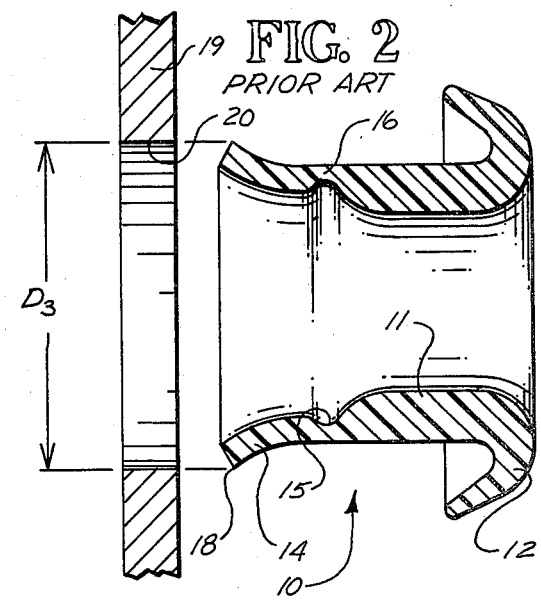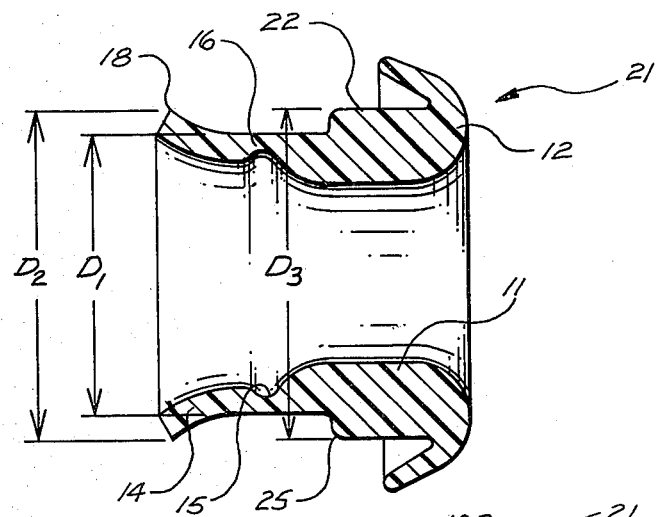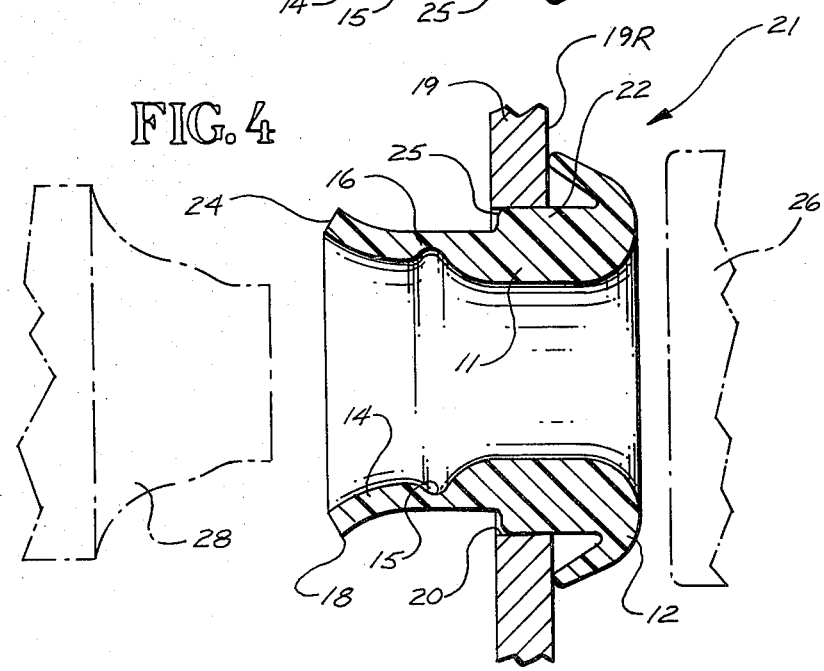

SELF-RETAINING CLOSE TOLERANCE BUSHING

RELATED APPLICATION

This application is a continuation-in-part application based, in part, on the copending application of John H. Bell, Ser. No. 166,597, filed July 7, 1980, for "Improvement in Self Retaining Bushings and the Like", now abandoned.

BACKGROUND OF THE INVENTION

The present invention relates generally to molded, non-metallic, self-retaining bushings; and, more particularly, to improved self-retaining bushings molded from a deformable, resilient, thermoplastic material and which are suitable for usage in a wide range of diverse applications—especially, applications which require adherence to close tolerance inside and outside diameters—viz., tolerances on the order of ±0.005" and, in many instances, on the order of only ±0.002"—and/or have stringent requirements in terms of sound and/or shock absorbency characteristics. More specifically, the present invention comprises a significant improvement to self-retaining grommets of the type disclosed in U.S. Pat. No. 3,099,057.

While commercially available grommets and similar self-retaining fasteners of the types disclosed in the aforesaid U.S. Pat. No. 3,099,057 have proven to be quite satisfactory for many commercial and industrial applications, they have not generally been found acceptable for usage in applications requiring extremely close tolerances. This has principally been due to the fact that during the molding process for forming such devices, the extremity of the deformable grommet body is flared outwardly, requiring the usage of oversized fastener-receiving holes into which the device is to be inserted. Such oversized holes result in undesired wear and/or chafing problems and undesired noise problems attributable to radial movement of the device in the oversized hole during usage. Moreover, self-retaining grommets of the type disclosed in the aforesaid U.S. Pat. No. 3,099,057 have further found only limited usage in applications requiring either or both of sound absoring and/or shock absorbing characteristics—this due to the limited amount of resilient material that can be employed in the interior of such devices since standard expansion-type tooling employed to "set" the self-locking device is required to pass freely into the interior of the device for purposes of expanding the same.

Thus, in general, self-retaining grommets and similar devices of the type disclosed in the aforesaid U.S. Pat. No. 3,099,057 employ a tubular body portion molded from a suitable thermoplastic material (such, for example, as nylon) with the body portion having an enlarged retaining head at one end and an upsettable, resilient, deformable, flip portion at its opposite extremity which is designed to be expanded outwardly by means of appropriate standard expansion-type tooling inserted into the tubular body portion. During installation the outwardly expanded deformable extremity is caused to flip outwardly and backwardly upon the tubular body about a weakened annular area of reduced wall thickness defined by a groove formed interiorly in the tubular body portion so as to form a second enlarged retaining head disposed on the device and spaced axially from the first integral enlarged retaining head by an axial distance equal to the thickness of the component(s) through which the device is inserted. However, while the two enlarged retaining heads serve to effectively prevent axial movement of the device within the fastener-receiving hole extending through such component(s), the fact that such hole must be oversized to accommodate the outwardly flared extremity of the deformable body portion prior to setting thereof, permits of undesired radial movement within the hole, thereby producing wear and resulting in unwanted noise levels. As a consequence, devices of the type disclosed in the aforesaid U.S. Pat. No. 3,099,957 have generally found acceptance only as grommets, eyelets, liners and the like; and, such devices have not found widespread acceptance as bushings—especially for use in close tolerance applications where clearances between the I.D. of the bushing body and, for example, a rotating shaft extending therethrough, or between the O.D of the bushing body and the structural component(s) within which it is mounted, must be maintained within tolerances ranging from ±0.002" to ±0.005".

SUMMARY OF THE INVENTION

Accordingly, it is a general aim of the present invention to provide an improved unitary, self-retaining, molded close tolerance bushing which overcomes all of the aforesaid disadvantages inherent with commercially available and known molded grommets or the like and which permits of usage in a wide range of diverse close tolerance applications; yet, which at the same time takes advantage of the flared extremity produced in such known conventionally available devices.

More specifically, it is an object of the present invention to provide an improved low-cost, self-retaining, unitary, molded close tolerance bushing having a premolded enlarged retaining head at one end thereof and a resilient or elastic deformable flip end at its opposite extremity capable of being expanded outwardly and reversely folded backwardly upon the bushing body to form a second enlarged retaining head spaced axially from the first premolded head for firmly securing the bushing to one or more sheet-like components.

A further and more detailed object of the invention is the provision of a unitary, molded, self-retaining bushing which, because of its unique configuration, facilitates blind installation of the bushing into difficult-to-reach locations and, at the same time, facilitates insertion of suitable standard expanding tooling into the bushing interior for setting such bushing in a desired permanent location.

An ancillary object of the invention is the provision of an improved self-retaining bushing of the molded, unitary, deformable type which readily permits use of any desired amount of thermoplastic material and of any desired wall thickness for maximizing either or both of the sound absorbency and/or shock absorbency characteristics of the bushing; yet, wherein such additional material and increased wall thickness do not impede or otherwise deleteriously affect either the flexibility of the expandable flip end of the bushing or free access to the bushing interior by required standard expansion-type tooling used to "set" the bushing in place.

DESCRIPTION OF THE DRAWINGS

These and other objects and advantages of the present invention will become more readily apparent upon reading the following detailed description and upon reference to the attached drawings, in which:

FIG. 1 is a cross-sectional view taken longitudinally through a conventional grommet of the type described in the aforesaid U.S. Pat. No. 3,099,057, here illustrating particularly, in exaggerated form for purposes of clarity, the outwardly flared extremity of the expandable end of the grommet which is inherently formed in the molding process;

FIG. 2 is a cross-sectional view similar to FIG. 1, but here illustrating the conventional self-retaining grommet during an initial step in its installation in a sheet-like structural component and depicting particularly the need to provide an oversized opening in the structural component sized to readily receive the outwardly flared extremity of the grommet;

FIG. 3 is a cross-sectional view taken longitudinally through an improved deformable close tolerance bushing embodying features of the present invention;

FIG. 4 is a cross-sectional view similar to FIG. 2, but are illustrating the close tolerance bushing of the present invention during the initial stages of its installation in a sheet-like structural component and illustrating also, in phantom, conventional tooling of the type that can be used to set the bushing in place;

Figure 5:
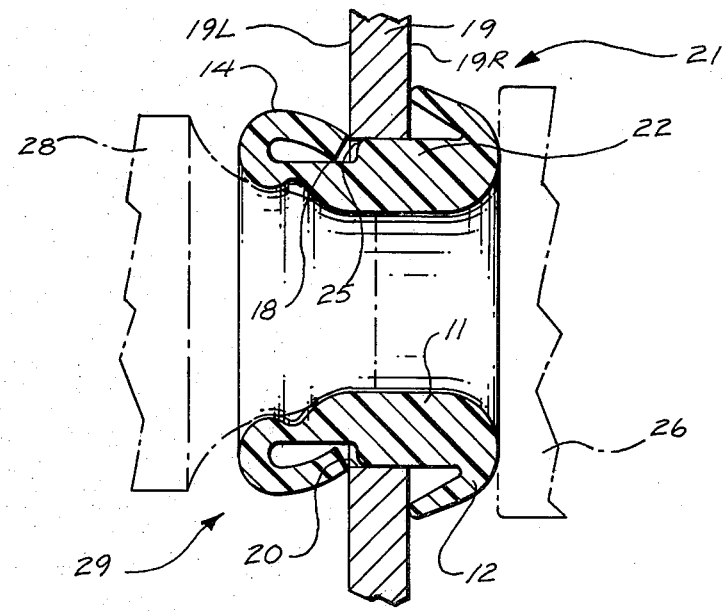
FIG. 5 is a view similar to FIG. 4, but here illustrating the close tolerance bushing of the present invention following setting thereof with the formable extremity of the tubular body portion having been expanded outwardly and having been flipped backwardly upon itself so as to securely affix the bushing in place within the hole passing through the structural member; and, FIG. 6 is a view similar to FIG. 5 but with the expanding tooling removed, here illustrating a slightly modified form of the invention particularly suitable for use in applications where there is a need for providing increased shock and/or sound absorbing characteristics in the bushing.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as expressed in the appended claims.

DETAILED DESCRIPTION

Turning first to FIG. 1, there has been illustrated a conventional, commercially available, molded thermoplastic self-retaining grommet, generally indicted at 10, of the type generally disclosed in the aforesaid U.S. Pat. No. 3,099,057. Such a device comprises a generally tubular body portion 11 having an outside diameter $D_1$, a premolded enlarged retaining head 12 at one extremity (the righthand extremity as viewed in the drawing), and an axially extending flexible flip portion 14 of reduced wall thickness at its opposite extremity. In the aforesaid U.S. Pat. No. 3,099,057, such a device is illustrated in FIG. 1 and is described in the specification as a grommet having a tubular body portion " . . . preferably of a constant diameter fitting snugly within the hole . . . yet readily insertable therein." (Col. 3, ll. 33—35).

In actual practice, however, it has been found that when the exemplary grommet 10 is molded, a core pin (not shown) having a raised annular ridge must be positioned within the mold for forming an annular groove 15 at the junction between the main tubular body portion 11 and the axially extending flip extemity 14 of reduced wall thickness so as to form an annular weakened area 16 about which the deformable flip portion 14 can be expanded and flipped when the grommet is installed. Such a core pin must then be removed prior to complete setting of the heated thermoplastic material— —and, this operation inherently produces a flared extremity 18 having an outside diameter $D_2$ greater than the outside diameter $D_1$ of the main tubular body portion 11.

As a consequence of this phenomenon, when the fastening device 10—be it a grommet, eyelet, liner, or other type of self-retaining fastener—is to be mounted in a sheet-like structural component such as the stiffener 19 shown by way of example in FIG. 2, it is necessary to form an oversized fastener-receiving opening 20 therein having a diameter $D_3$ where $D_3$ is at least equal to and, preferably greater than, the diameter $D_2$ of the flared extremity 18. In a typical exemplary bushing, the diameter $D_2$ of the flared extremity 18 has been commonly found to range between 0.004" to 0.006" greater than the diameter $D_1$ of the main tubular body portion 11 and, in general, the flared extremity has been found to be close to the upper end of that range. Consequently, when assembled within a structural component 19 having a fastener-receiving opening 20 with a diameter $D_3$ equal to or greater than $D_2$, there is a relatively loose radial fit between the main tubular body portion 11 and the structural component 19. As a result, the fastening device 10, even when tightly crimped in place axially, is free to move radially and such motion tends to produce undesired wear which gradually further loosens the device. Moreover, the loose fit between the structural component and the device also results in undesired nose levels. As a result, flip-type devices of the type disclosed in the aforesaid U.S. Pat. No. 3,099,057 have found principal use as grommets, (see, e.g., National Aerospace Standard NAS 1368, October, 1959). Such devices have, however, generally been unsatisfactory for use as bushings and, particularly, for use as close tolerance bushings.

Those skilled in the art will, of course, appreciate that the foregoing problem cannot be "solved" by simply cutting off the outwardly flared extremity 18 since the outwardly flared extremity must be flipped over when the device is set in place in a structural member or the like. Of couse, where economy is not an objective, an expandable/contractable core pin can be employed which can be removed from the piece part after the heated thermoplastic material has fully set in the mold. However, such a "solution" is relatively expensive and has not been found compatible with the desire to mass produce low-cost bushings for a wide range of uses and which are competitive with conventional metallic fastening devices. Similarly, efforts to resolve the problem by resort to complex expensive die modifications have not proven satisfactory. Moreover, efforts to eliminate the outwardly flared extremity 18 by application of heat in an attempt to obtain the benefits of inherent resilient "memory" of the thermoplastic materials have failed to produce the desired results.

Consequently, prior to the advent of the present invention, fastening devices of the type disclosed in the aforesaid U.S. Pat. No. 3,099,057 have simply not found acceptance in close tolerance applications such as are commonly required with bushings of the type used, for example, in the automotive or aircraft industries and/or for use with rotating shafts or the like; but, rather, such devices have principally been utilized and have found widespread acceptance as grommets used to line holes to minimize chafing and wear of products inserted through the holes. Usage as a bushing, on the other hand, has been limited to applications where radial movement of the device can be tolerated, where relatively high noise levles resulting from chattering of the device within the oversized hole is not objectionable and/or where shock absorbency characteristics are not specified.

In accordance with one of the important aspects of the present invention, provision is made for eliminating the loose fit between self-retaining bushings of the type having flexible, flippable extremities and the oversized hole(s) in structural component(s) which are required to accept the flared extremity; yet, wherein advantage can be taken of the outwardly flared extremity to facilitate-lead-in of expansion-type tooling introduced into the interior of the bushing during installation. Moreover, as a result of retaining the outwardly flared extremity, upon flipping of the resilient deformable end of the bushing such extremity is, in effect, turned inside out. Consequently, the outwardly flared extremity becomes an inwardly flared extremity which engages the outer surface of the main tubular body portion of the bushing and aids in maintaining the flip portion 14 of the bushing in a somewhat stand-off position from the main tubular body 11, thereby forming a second enlarged retaining head which coacts with the first enlarged retaining head to preclude axial motion of the bushing. To this end, and as best illustrated in FIG. 3, close tolerance bushings manufactured in accordance with the present invention—for example, the exemplary bushing 21 shown in FIG. 3—are provided with an integral molded external stepped shoulder 22 which is formed on and surrounds the main tubular body portion 11 and extends axially from the premolded enlarged head 12 towards, but terminates short of, the weakened area 16 defined by the internal groove 15. The stepped shoulder 22 has an outer diameter $D_3$ at least equal to and, preferably greater than, the outer diameter $D_2$ of the outwardly flared extremity 18 on the flip portion 14 of the bushing.

During installation, and as best illustrated in FIG. 4, the bushing 21 is inserted into an opening or hole 20 formed in a stiffener or similar structural component 19 with the premolded enlarged head 12 being seated against one wall of the structural component 19 (the righthand wall 19R as viewed in FIG. 4). As here shown, the stepped shoulder 22 of the exemplary bushing 21 has an external diameter equal to that of the flared extremity 18 and essentially equal to the diameter of the hole 20 in the structural component 19; although, preferably, the stepped shoulder has a somewhat greater external diameter than the flared extremity 18. In either case, while the flared extremity 18 is free to pass through the hole 20, the stepped shoulder 22 fits snugly within the hole and precludes radial movement of the bushing 21 within the hole. The axial length of the stepped shoulder 22 is not critical to the present invention and may vary dependent upon the thickness of the structural component(s) into which the device is to be inserted. For relatively thin structural components the axial length of the stepped shoulder 22 will desirably approach the thickness of the structural component; whereas when used with relatively thick components, it is only necessary that the shoulder 22 have a sufficient axial length as to provide a good close tolerance bearing surface.

In carrying out the present invention, entry of the bushing 21 into the hole 20 is facilitated by the outwardly flared extremity 18 which, because of the slight flare, presents a tapered or somewhat frusto-conical lead-in portion 24 at its leading end as the bushing is inserted into the hole 20. Such facilitated lead-in is, of course, further improved where the hole 20 and shoulder 22 are slightly larger than the flared extremity 18. Similarly, the stepped shoulder 22 is preferably provided with a rounded radius of curvature at its inboard end as indicated at 25 which serves to facilitate insertion of the shoulder into the opening 20.

The flared extremity 18 is futher highly advantageous in that it facilitates insertion of standard expansion-type tooling into the interior of the bushing 21 for the purpose of permanently securing the bushing in place. Thus, as best observed upon reference to FIGS. 4 and 5 conjointly, it wil be noted that during installation of the bushing 21, an anvil or similar support tool 26 is positioned against the premolded enlarged head 12 of the bushing while a tapered expanding tool 28 is moved axially (to the right as viewed in the drawing) into the flared extremity 18 of the bushing. As the expanding tool 28 is advanced, it coacts with the reduced wall thickness flip extremity 14 of the bushing and expands that part of the bushing outwardly with primary bending taking place at the annular weakened area 16 defined by groove 15. As the expanding tool 28 continues to advance into the tubular housing 11 and towards the anvil and support tool 26, expansion or bending of the flexible flip extremity 14 continues until such point as the outwardly flared extremity 18 reaches a transverse plan passing through and defined by the groove 15 and annular weakened area 16; at which point the elastic nature of the thermoplastic material causes the reduced wall thickness flip extremity 14 to "flip" over and backwardly upon the tubular body portion 11 of the bushing 21. That is, the elastic flip extremity 14 is turned inside out as illustrated in FIG. 5 with the outwardly flared extremity 18 depicted in FIG. 4 becoming an inwardly flared extremity and with the thus flipped extremity 14 defining a second enlarged retaining head, generally indicated at 29, which now coacts with opposite wall of the structural component 19 (i.e., the left wall 19L as viewed in FIG. 5). Consequently, the two enlarged retaining heads 12, 29 serve to preclude axial movement of the bushing within the bushing-receiving opening or hole 20, while the snug close tolerance fit provided by the stepped shoulder 22 precludes radial movement of the bushing within the hole.

Those skilled in the art will readily appreciate upon inspection of FIGS. 4 and 5 that the installation operation hereinabove described requires that conventional expanding tooling 28 have freedom of access into the interior of the bushing 21 in order to fulfill its functin of expanding the reduced wall thickness flip extremity 14 outwardly and producing the desired elastic flipping action. Prior to the advent of the present invention, this fact has provided a limiting constraint on the thickness of the wall defined by the main tubular body portion 11 of the bushing and, consequently, sufficient thermoplastic materials could not be employed to provide effective sound deadening and/or shock absorbing characteristics for the bushing. However, in the practice of the present invention this problem has been obviated since the stepped shoulder 22 can be designed to provide any desired or required wall thickness so as to permit maximization or optimization of sound and shock absorbency characteristics.

Figure 6:
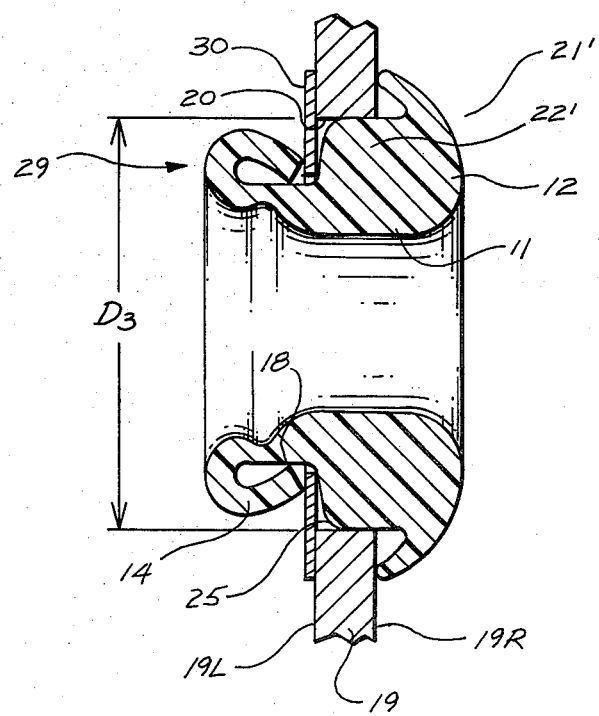

For example, referring to FIG. 6 it will be observed that the stepped shoulder 22' there shown is considerably thicker in a radial direction than is the shoulder 22 shown in FIGS. 3–5. Indeed, the shoulder 22' and the opening 20 in structural component 19 each have a diameter $D_3$ which is considerably greater than the outside diameter of the second retaining head 29 formed during the flipping operation. To prevent axial movement of the bushing 21' out of the hole 20 (i.e., axially to the right as viewed in the drawing), a retaining ring 30 having an outside diameter greater than $D_3$ and an inside diameter at least equal to the diameter $D_2$ of the flared extremity 18 (FIG. 3) but less than the diameter of the enlarged head 29 is positioned about the tubular body portion 11 of the bushing 21' prior to setting of the bushing with the exemplary tools 26, 28 (Cf., FIGS. 4 and 5). Consequently, when the reduced wall thickness flip extremity 14 is expanded and turned inside out to set the bushing 21' in place, the second enlarged retaining head 29 thus formed serves to engage the retaining ring 30 and crimps the retaining ring between the retaining head 29 and the lefthand wall 19L of the structural component 19. Thus, the two enlarged retaining heads 12, 29 together with the retaining ring 30 serve to effectively lock the bushing in place and to preclude axial movement, while shoulder 22' precludes radial movement.

Thus, there have herein been disclosed improved self-retaining close tolerance bushings formed of thermoplastic material which are economical, easily installed, and which provide an effective, permanently affixed installation once the elastic flip extremity 14 is turned inside out. Such bushings have found widespread commercial acceptance in the aircraft and automotive industries and/or for use with rotating shafts or the like, where such applications require close tolerance fits ranging from on the order of ±0.005" to as litle as ±0.002".

The particular thermoplastic material employed in such close tolerance bushings is not critical to the present invention and various commercially available well-known materials can be employed. Merely by way of example, however, excellent results have been achieved when the thermoplastic material comprises nylon (an inherently tough material) with or without additives such as molybdenum disulfide to provide added lubricity and reduced coefficients of friction. However, while nylon is an inherently tough material characterized by its durability and long life, it also tends to be somewhat noisy when used in some close tolerance installations such, for example, as seat moutings in automobiles. Consequently, where noise problems are particularly objectionable, it is preferred to use polyethylene which is characterized by its non-squeak characteristics. Obviously, however, other thermoplastic materials such, for example, as polyvinylchloride, Teflon, polycarbonates, acetal resins, etc., can be employed. Where the bushing is to be used in heated environments, it is preferably formed of a heat resistant nylon or a heat resistant urethane material. It is, of course, necessary that the particular thermoplastic material selected be characterized by both elasticity and ductility which permit progressive deformation of the material in the setting operation until a point is reached where a self-impelled elastic recoil action occurs to turn the flipped extremity 14 of the device inside out so as to provide a tight, close tolerance, snug fitting, permanent bushing installation. Those skilled in the art will, of course, appreciate that with increased bushing wall thicknesses of the types permitted with the present invention, the range of thermoplastic materials having various durometers and which are suitable for use in self-retaining bushings will be significantly increased.

What is claimed is:

1. In combination with a structural component having a bushing-receiving opening extending therethrough, a self-retaining molded bushing suitable for use in close tolerance installations wherein the tolerance to be maintained ranges from on the order of +0.002" to on the order of +0.005", said bushing being mounted in said bushing-receiving opening extending through said structural component, said bushing being formed of thermoplastic material and having a circumferentially continuous tubular body portion with an outside diameter $D_1$, an enlarged premolded first retaining head formed at one end of said body portion for coaction with one surface of said structural component in surrounding relation to said bushing-receiving opening therein, an annular groove formed internally of said tubular body portion and spaced axially from said premolded retaining head by a distance greater than the thickness of said structural component in which said bushing is mounted with said annular groove defining an annular weakened area in said tubular body portion, said tubular body portion having an axially extending area of reduced wall thickness outboard of said annular groove and at the end of said body portion remote from said premolded first enlarged retaining head, said end of said body portion remote from said premolded first enlarged retaining head having an outwardly flared extremity with an outside diameter $D_2$ where $D_2$ is greater than $D_1$, and an external stepped annular shoulder formed on said tubular body portion, said shoulder extending axially from said premolded enlarged retaining head and having an axial length sufficient to provide a good close tolerance bearing surface having a tolerance in the range of +0.002" to +0.005" engagable with said structural component in which said bushing is mounted and having an outside diameter $D_3$ substantially equal to the diameter of said bushing-receiving opening where $D_3$ is at least equal to $D_2$, said axially extending area of reduced wall thickness being expandable outwardly about said annular weakened area by force applied internally thereto until the expanded end of said tubular body portion flips over and backwardly upon said body portion by self-propelled elastic action to form a reversely folded second enlarged retaining head so that said bushing is securely fastened to said structural component with axial movement thereof within said bushing-receiving opening being precluded by coaction between said first and second enlarged retaining heads and the opposite surfaces of said structural component, while radial movement of said bushing within said bushing-receiving opening is precluded by a close tolerance fit with said stepped shoulder.

2. The combination as set forth in claim 1 wherein said stepped annular shoulder terminates at its inboard end and remote from said first retaining head with a rounded radius of curvature so as to facilitate insertion of said shoulder in said bushing-receiving opening in said structural component.

3. The combination as set forth in claims 1 or 2 wherein said stepped annular shoulder and said tubular body portion define an area of increased wall thickness of thermoplastic material for enhancing sound and/or shock absorbency characteristics.

4. The combination as set forth in claims 1 or 2 wherein $D_3$ exceeds $D_2$ and said stepped annular shoulder and said tubular body portion define an area of increased wall thickness of thermoplastic material for enhancing sound and/or shock absorbency characteristics.

5. The combination as set forth in claims 1 or 2 wherein $D_3$ is greater then the diameter of said reversely folded second enlarged retaining head and wherein a retaining ring is interposed between said second retaining head and said structural component, said retaining ring having an outside diameter greater than $D_3$ and an inside diameter greater than $D_2$ and less than the diameter of said second retaining head.

6. The combination as set forth in claims 1 or 2 wherein said bushing is formed of nylon.

7. The combination as set forth in claims 1 or 2 wherein said bushing is formed of nylon and molybdenum disulfide.

8. The combination as set forth in claims 1 or 2 wherein said bushing is formed of polyethylene.

* * * * *